Oct. 1, 1957
T. J. KEARNEY
2,808,064
DEGREASING MACHINE
Filed May 5, 1954
6 Sheets-Sheet 4
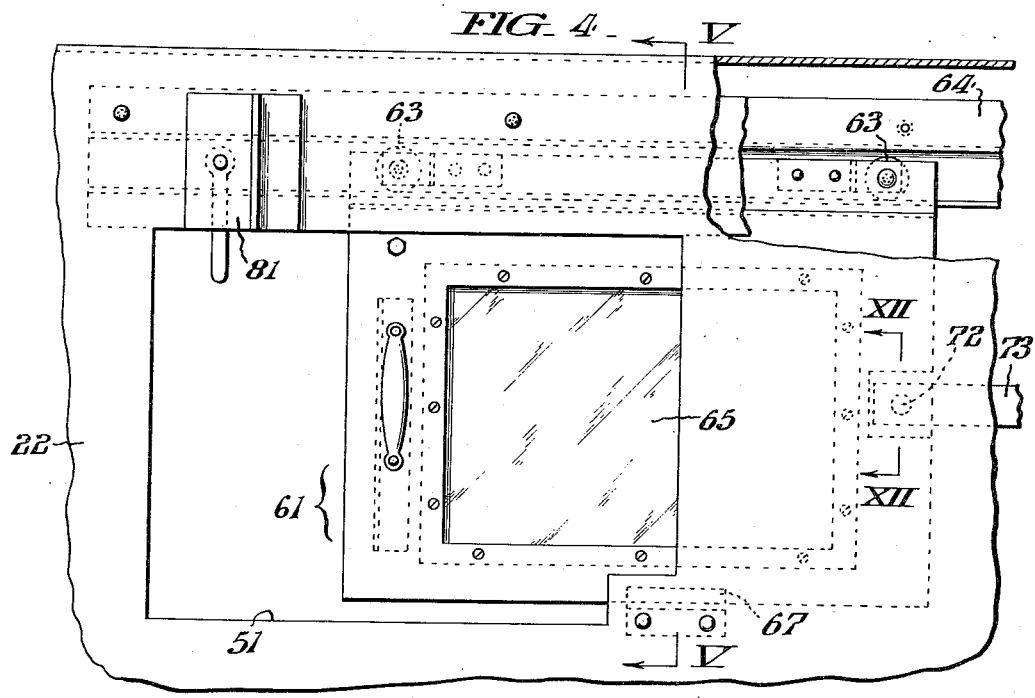
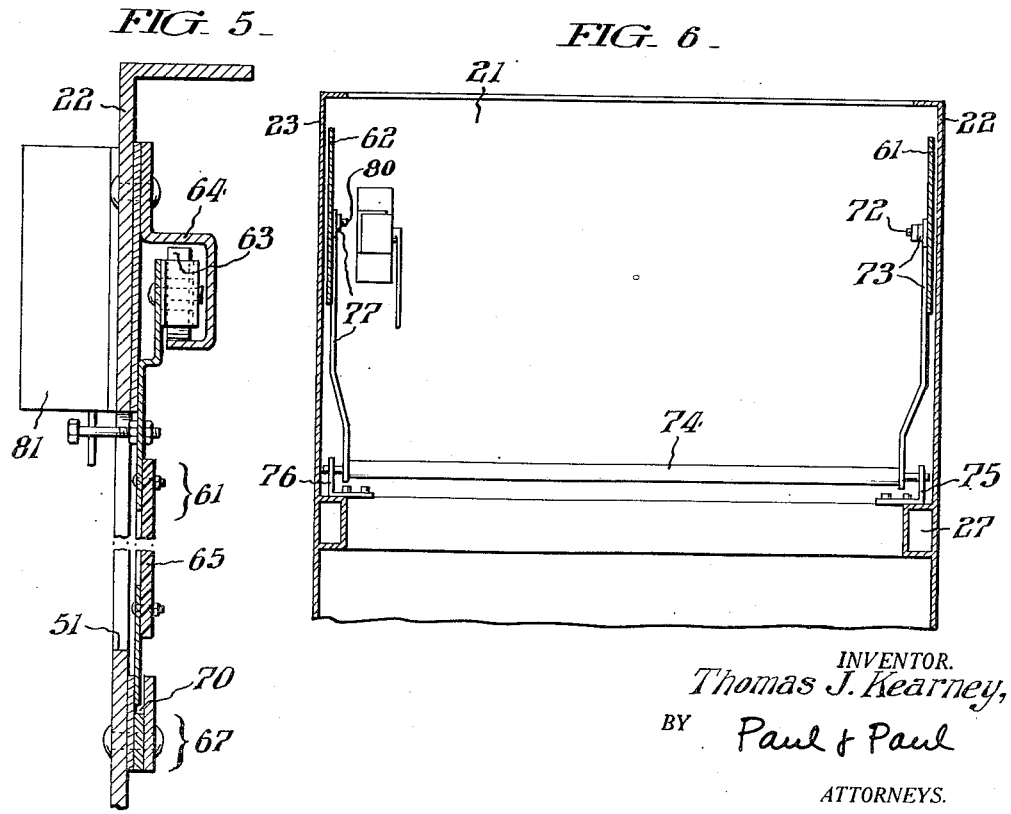
INVENTOR.
Thomas J. Kearney,
BY Paul & Paul
ATTORNEYS.

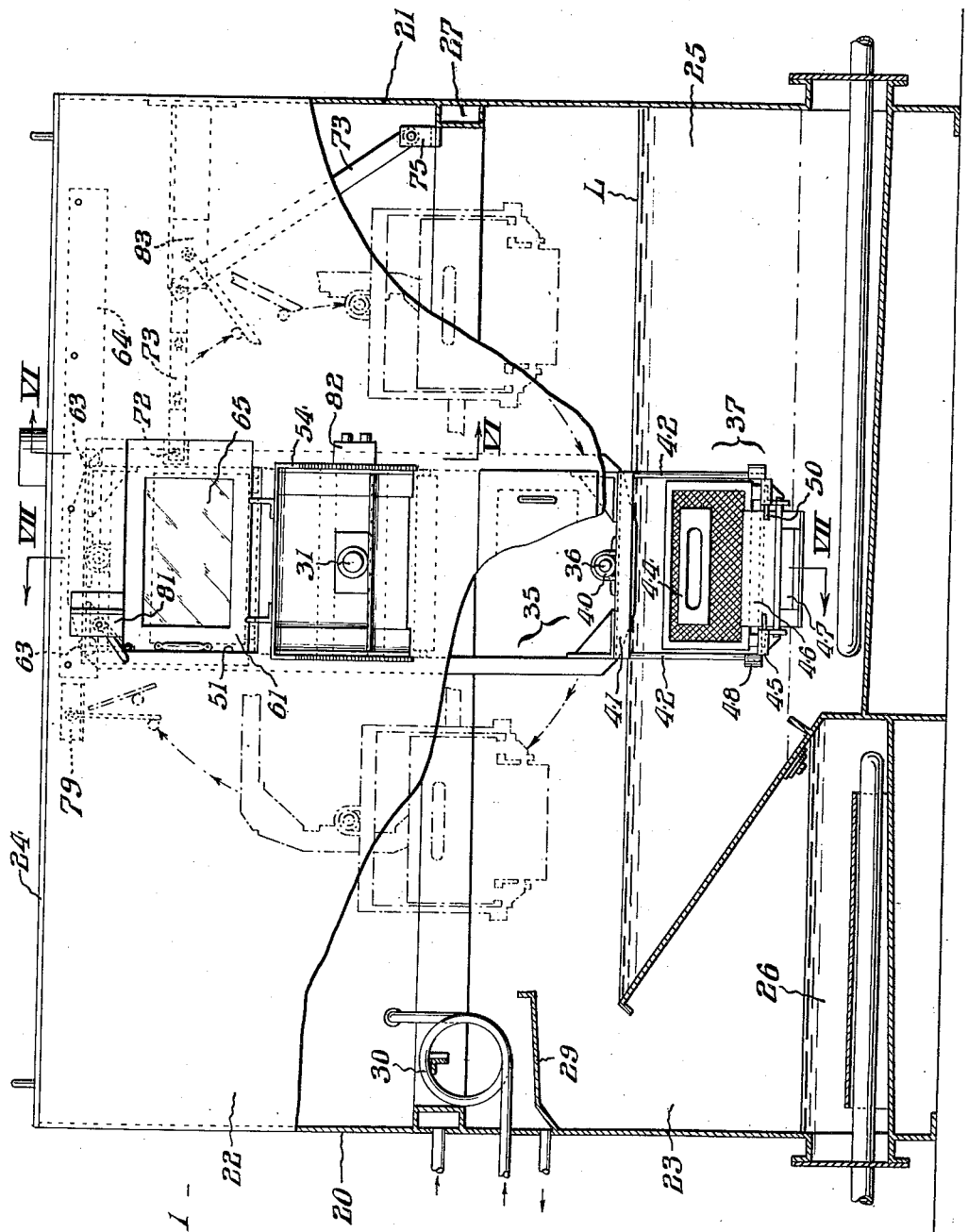

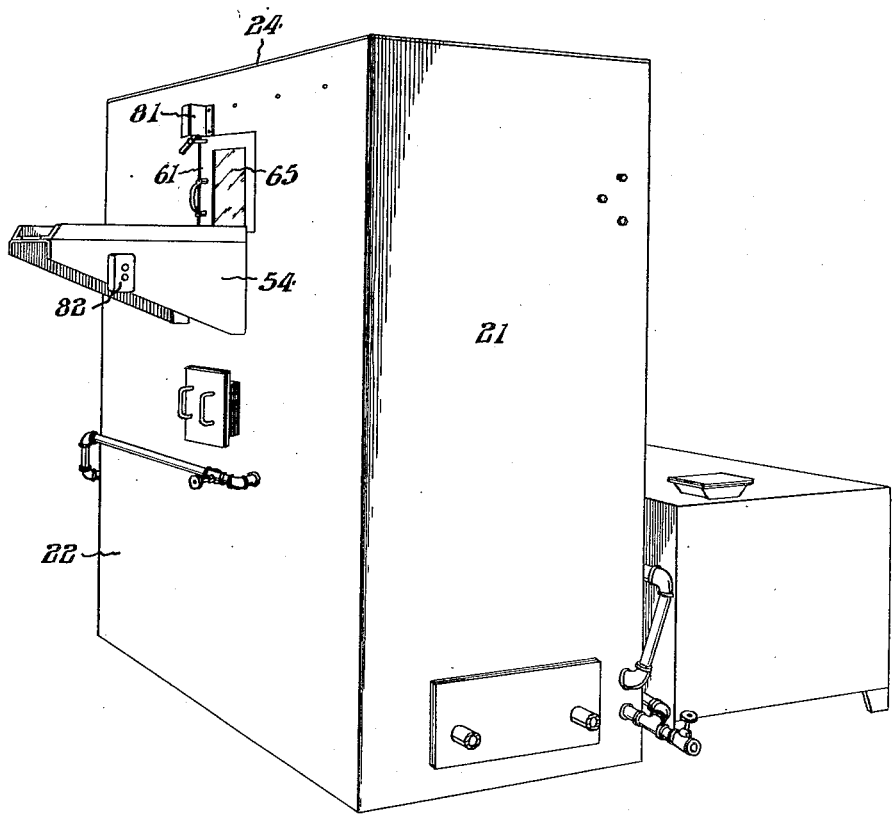

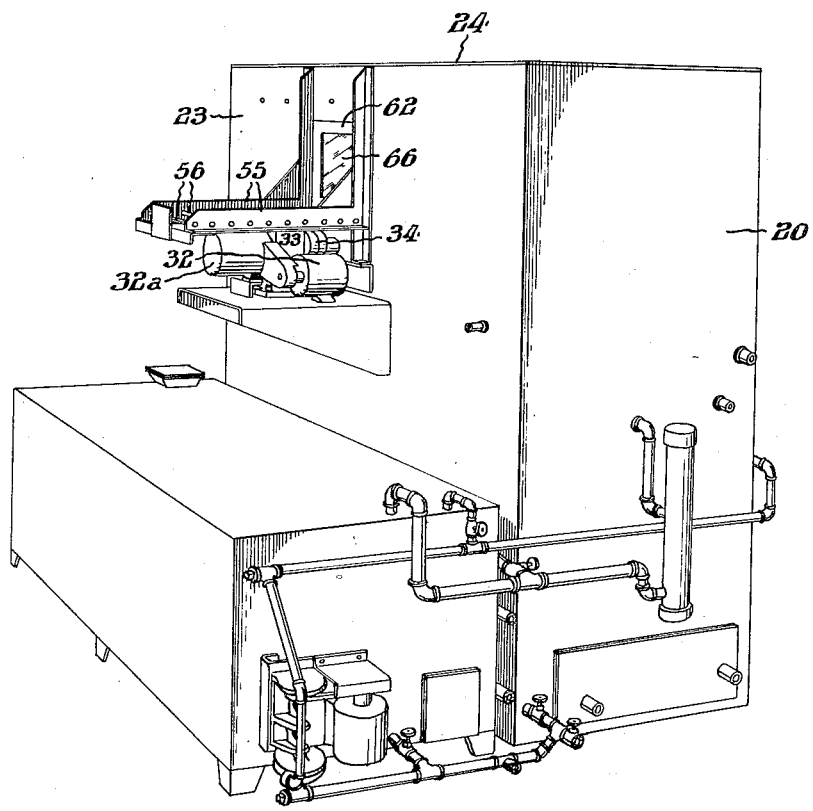

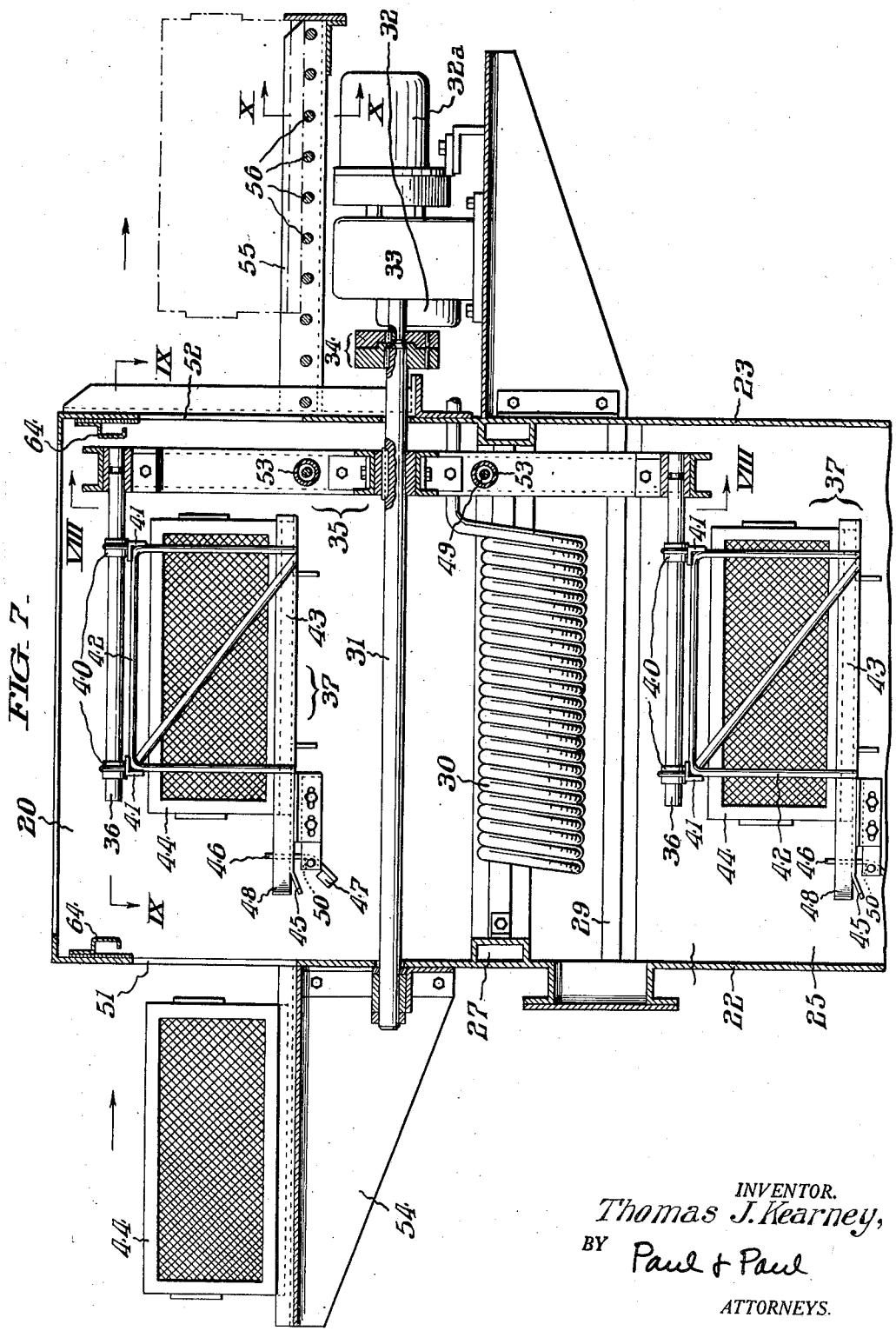

Oct. 1, 1957 T. J. KEARNEY 2,808,064
DEGREASING MACHINE
Filed May 5, 1954 6 Sheets-Sheet 6
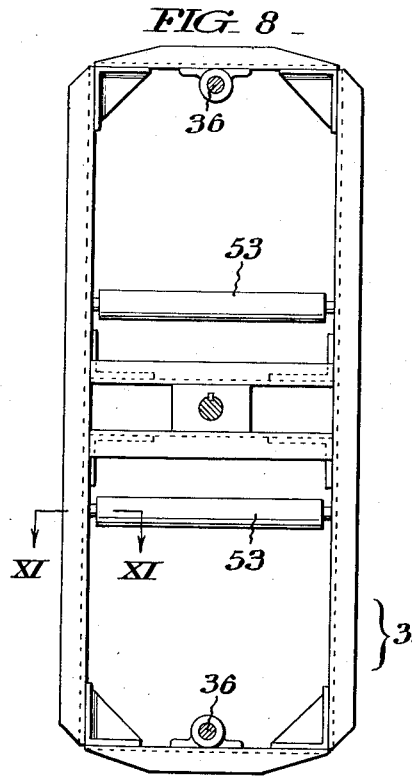
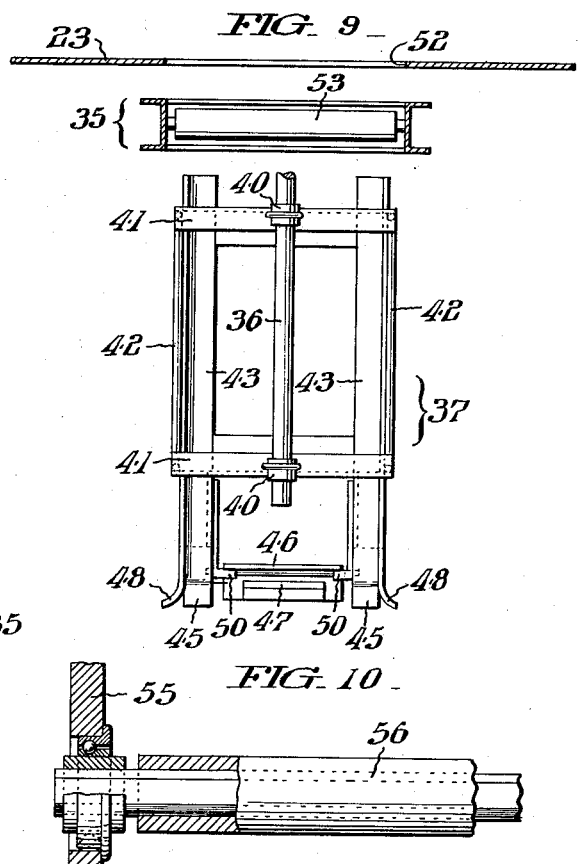
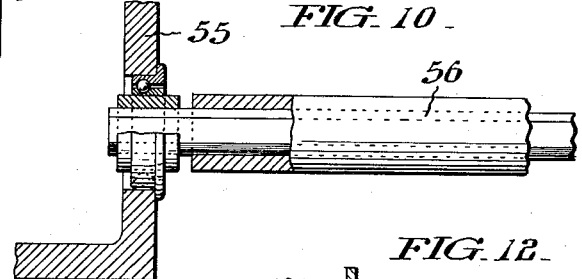
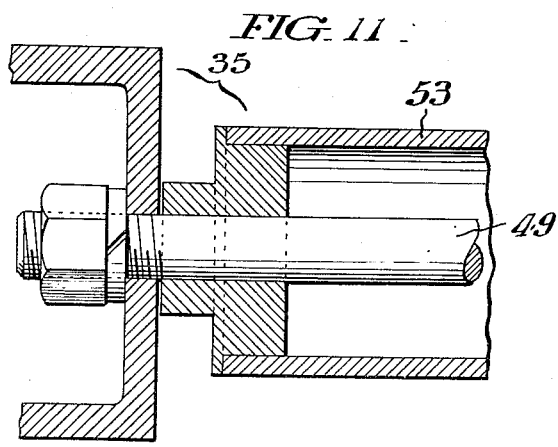
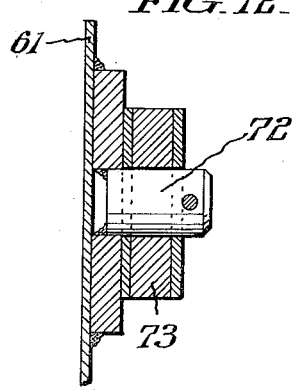
INVENTOR.
Thomas J. Kearney,
BY Paul & Paul
ATTORNEYS.

United States Patent Office 2,808,064
Patented Oct. 1, 1957

2,808,064

DEGREASING MACHINE

Thomas J. Kearney, Detroit, Mich., assignor to Detrex Chemical Industries, Inc., a corporation of Michigan Application May 5, 1954, Serial No. 427,756

10 Claims. (Cl. 134—58)

This invention relates to a degreasing machine, and more specifically concerns a degreaser having a rotatable framework which carries work objects up and down inside an enclosure which contains degreasing liquid, vapor, or both.

One degreaser of this general type is disclosed and claimed in my U. S. Patent No. 2,673,835, granted March 30, 1954. The apparatus shown in the drawings of that patent has an enclosure in which the degreasing is carried out, and has a door through which the work objects are inserted into and withdrawn from the enclosure. It is an object of this invention to improve upon the means for feeding the greasy work objects into the enclosure, and for removing the degreased work objects from the enclosure. Another object is to provide a degreaser construction wherein work objects may be quickly inserted into and removed from the degreaser. Still another object is to provide a degreaser having a loading and unloading construction permitting concurrent loading and unloading of the work objects, all in straight line motion. Other objects and advantages of the invention will further become apparent hereinafter and in the drawings, whereof:

Fig. 1 represents a front view of a degreasing machine which embodies features of this invention, the lower portion of the front wall of the degreaser being broken away in order more particularly to illustrate important details;

Fig. 2 represents a perspective view of the degreasing machine shown in Fig. 1, looking toward the front and one end of the machine;

Fig. 3 represents a perspective view of the machine illustrated in Figs. 1 and 2, looking toward the rear and the other end of the machine;

Fig. 4 represents an enlarged front view of the door arrangement which appears in the upper central portion of Fig. 1;

Fig. 5 represents a sectional view taken as indicated by the lines and arrows V—V which appear in Fig. 4;

Figs. 6 and 7 represent sectional views taken as indicated by the lines and arrows VI—VI and VII—VII respectively, which appear in Fig. 1;

Figs. 8, 9 and 10 represent sectional views taken as indicated by the lines and arrows VIII—VIII, IX—IX and X—X respectively, which appear in Fig. 7;

Fig. 11 represents a sectional view taken as indicated by the lines and arrows XI—XI which appear in Fig. 8; and Fig. 12 represents a sectional view taken as indicated by the lines and arrows XII—XII which appear in Fig. 4.

Turning now to the specific embodiment selected for illustration in the drawings, the degreasing machine there shown has two end walls 20, 21, a front wall 22, a back wall 23 and a top 24 forming an enclosure in which the work objects are degreased.

Means are provided at the bottom of the degreasing machine forming a liquid solvent reservoir 25 and a solvent boiling chamber 26, both containing a degreasing solvent such as perchlorethylene or the like. Spaced above the solvent level L is a horizontal, internal water jacket 27 which restricts the solvent vapors to the level of the bottom of the jacket. A condenser coil 30 is provided in the enclosure adjacent the wall 20, and a condensate collector tray 29 is located below it.

Means are provided for moving work objects up and down in the enclosure, into and out of contact with the degreasing chemical. As is illustrated more particularly in Fig. 7, a transverse rotatable main shaft 31 extends through the enclosure from front wall 22 to back wall 23. An electric motor 32 and a gear reducer 33 are connected to the transverse shaft 31 through a coupling 34. Within the enclosure, a balanced, elongated, rotatable frame 35 is centrally keyed to the shaft 31 for rotation in a vertical plane parallel to the walls 22, 23. The construction of frame 35 is more particularly shown in Fig. 8. At each end the frame 35 has a round carrier shaft 36 which extends substantially parallel to the shaft 31. A carrier 37 is suspended on bearings 40, 40 from each shaft 36, the carriers being rotatable with respect to the shafts 36 whereby they hang directly below the shafts.

Each carrier 37 comprises a frame including horizontal angle irons 41 fixed to the bearings 40, and dependent rods 42 fixed to tracks 43 at the bottoms of the rods 42 (Figs. 7, 9). The tracks 43, here shown as angle irons, form floors supporting the individual baskets 44 which contain the work objects. The rods 42 are arranged in two spaced, vertical planes which extend substantially parallel to main shaft 31, and the space between them is open, permitting straight line movement of successive baskets 44 through the carriers in a path substantially parallel to the main shaft 31.

At their front ends, the tracks 43 have downwardly inclined portions 45 which are adjacent to the front wall 22, and also have outwardly extending end portions 48 (Fig. 9), forming guides for the baskets 44. A pivoted, overbalanced latch 46 having a weight 47 extends across between the front end portions of tracks 43. Latch 46 has capacity to be pivoted from the vertical toward rear wall 23, but a stop 50 prevents its swinging movement in the opposite direction.

Means are provided on the front and back walls of the degreaser for inserting baskets 44 or other containers for the greasy work objects into the degreasing enclosure and for removing the baskets containing degreased work objects from said enclosure. It will be observed that the front wall 22 is provided with an opening 51 and the rear wall 23 with an opening 52, each opening being of a size sufficient to accommodate the baskets 44. The openings 51, 52 are substantially aligned with one another along a line substantially parallel to the main shaft 31. Each opening 51, 52 is preferably located as high as possible on the degreaser walls, preferably at the level of the top of the path traveled by the carriers 37. At this location, the spacing between each opening 51, 52 and the main shaft 31 is substantially equal to the spacing between the upper carrier 37 and the shaft 31. In view of this spacing, each carrier 37 comes into registry with both openings 51, 52 as the frame 35 is rotated about the axis of main shaft 31.

The frame 35 carries two rollers 53, 53 (Figs. 7 and 8) which are spaced from the shaft 31 at a distance substantially equal to the spacing of the bottom of the upper carrier 37 from shaft 31, when the carrier 37 is in registry with the openings 51, 52. The construction of the rollers is more particularly illustrated in Fig. 11, roller 53 being free on a shaft 49 which is fixed to the arms of the frame 35. The front wall 22 has an external platform 54 for the baskets containing greasy work objects, and the back wall 23 has an external platform 55 for the baskets containing the degreased work objects. The supporting surfaces of the platforms are at substantially the level of the rollers 53. The back platform 55 has gravity rolls 56 at about the same level. Fig. 10 shows in further detail the character of the bearings on which the rollers 56 are supported.

Referring more particularly to Figs. 1–5, a front door 61 and a rear door 62 are provided inside the openings 51, 52. As shown in Fig. 4, each door is hung on rollers 63 traveling along a horizontal channel 64 fixed to the wall. Each door 61, 62 has an inspection window 65, 66. Plates 67 are fixed to the wall at the bottom of each door forming a guide channel 70 in which the bottom edge of the door slides.

Means are provided linking the doors 61, 62 for concurrent operation. Referring to Figs. 6 and 12, front door 61 carries a pivot 72 linked to levers 73, 73, one of which is fixed to a shaft 74 pivoted in fixed angle irons 75, 76. Shaft 74 extends along the end wall 21 of the degreaser. Another pair of levers 77, 77, is fixed to shaft 74 and to a pivot 80 fixed on the rear door 62.

Switch means are provided for controlling the operation of the degreaser. The number 79 designates a normally closed conveyor limit switch which is fixed inside the enclosure and disposed in the path of movement of frame 37. When contacted by the frame 37, it is opened and shuts down the motor 32, and solenoid brake 32A operates, stopping the frame rotation when either carrier 37 is in registry with the doors 61, 62.

The number 81 represents a door limit switch which is connected into the circuit which includes the motor 32. When the doors 61, 62 are open, the switch 81 is open, and the frame 35 cannot be rotated, even if the switch 79 is closed. 82 designates a manually operable start switch which starts the motor 32 when doors 61, 62 are closed. The number 83 represents a vapor limit switch arranged in the path of movement of the frame. The specific wiring of the switches and their arrangement with respect to the doors and frame are preferably otherwise in accordance with the disclosure of my issued Patent No. 2,673,835, and are accordingly not further described herein. The switches are electrically connected to cause the carriers to progress intermittently within the enclosure. In this manner, a degreasing cycle is accomplished wherein the work objects are caused to dwell in the liquid solvent and in the solvent vapor. The degreasing cycle is preferably comparable to the cycle disclosed in my aforementioned issued patent.

In operation, the reservoir 25 and solvent boiling chamber 26 are provided with degreasing solvent at proper levels, maintained at proper temperatures, and cooling water is circulated through the jackets and condenser, thereby providing a liquid solvent reservoir and a solvent vapor space above it. One of the (empty) carriers 37 is in registry with the openings 51, 52, while the other is immersed in solvent. The operator opens the front door 61, and the back door 62 concurrently opens. A basket 44 containing greasy work objects is placed on the platform 54 and pushed through opening 51 on the upper carrier 37. Doors 61, 62 are closed, start switch 82 is manipulated, and the basket 44 is indexed downwardly. Frame 35 contacts vapor limit switch 83, stopping the frame. The frame 35 is started and carrier 37 completes its descent into the liquid solvent. The manner in which the vapor limit switch 83 stops the frame, and the manner in which the frame is started are matters of design constituting, of themselves, no part of this invention. The conveyor limit switch 79 is ultimately contacted by the opposite end of frame 35, cutting off the supply of power to the frame. The frame coasts past switch 79 through an arc of predetermined length, and eventually stops at the position wherein the remaining, empty carrier 37 is in registry with the doors 61, 62 and with the corresponding openings 51, 52. At this point the full carrier is immersed in liquid solvent, and the work objects are being degreased. The operator opens the door 61, places another basket 44 of greasy articles on the upper carrier 37, closes the doors, and again starts the machine, bringing the bottom basket of work objects out of the liquid up through the vapor. The machine is stopped by the vapor limit switch 83, is started, and is stopped by the conveyor limit switch 79 as before. The doors are opened, and the operator places another basket of greasy articles on the platform 54. The basket of greasy articles is pushed through the opening 51, contacting the basket of degreased articles and displacing that basket from carrier 37 over the roller 53 through the rear opening 52 on the gravity rolls 56 of the back platform 55. The latch 46 pivots, admitting the basket of greasy articles to the carrier 37, and the weight 47 then swings latch 46 to its upright position, whereby the latch retains the basket against accidental movement off the front end of the carrier 37. The doors 61, 62 are closed and the machine is again started. At most stages during the frame rotation, the frame members 35 serve as stops preventing possible movement of the baskets 44 off the back end of the carrier 37.

Since loading and unloading time is one of the most serious restrictions on the production rate of the degreaser, it is commercially important and advantageous to provide a construction as described and claimed herein. The loading operation, wherein each basket is pushed into the degreaser and is later displaced out the opposite side of the degreaser by the next basket, very substantially reduces the loading time.

It will be observed that the doors 61, 62 are located high above the top of the vapor zone, substantially at the top of the path of the carriers 37. Moreover, the doors are opened for only a short time each cycle. Accordingly, solvent is saved and possible health hazards reduced to a minimum, since the escape of solvent vapor is greatly decreased or substantially eliminated.

It will be appreciated that various modifications may be made in the form of the apparatus, as indicated in my issued Patent No. 2,673,835. The machine is readily adapted, for example, to spray the work objects with degreasing solvent rather than immerse them. Additionally, the number of carriers and the shape of the rotatable frame may be varied without departing from the scope of this invention.

It will further be appreciated that additional structures, such as conveyors or the like connected to the platforms 54, 55, may be utilized to facilitate the loading and unloading operation in accordance with this invention.

Moreover, it is to be emphasized that equivalent elements may be substituted for those specifically shown in the drawings, parts may be reversed, and certain features of the invention may be utilized independently of the use of other features, all within the spirit and scope of the invention as defined in the appended claims.

Having thus described my invention, I claim:

1. A machine for degreasing work object comprising an enclosure having a pair of spaced, opposed walls, a rotatable frame pivotally mounted for rotation about a transverse axis in said enclosure, said axis extending transversely of said walls, drive means connected to said frame for causing said rotation, a work objects carrier connected to said frame for movement in a substantially circular path around said axis, means in said enclosure for contacting and treating said work objects with a hot degreasing solvent, each of said walls having an opening which is spaced from said axis at a distance substantially equal to the spacing of said carrier from said axis, said openings being substantially transversely aligned, whereby the carrier comes into registry with said openings in the course of its movement about said axis, and control means for stopping said carrier when said carrier is in registry with said openings, each wall having a door for said opening, rotatable supporting means carried by said frame at a location adjacent the bottom of one of said openings, and means connected to both said doors for concurrently opening said doors.

2. The machine defined in claim 1 wherein the control means includes a switch fixed inside said enclosure and located in the path of movement of said frame.

3. The machine defined in claim 1 wherein connecting means are provided whereby one of said doors is opened in response to the opening movement of the other of said doors.

4. The machine defined in claim 3 wherein said connecting means comprises mechanical lever means interlocking said doors.

5. The machine defined in claim 1 wherein means is provided for stopping the rotation of the frame when said doors are open.

6. A machine for degreasing work objects comprising an enclosure having a pair of spaced, opposed walls, a rotatable frame pivotally mounted for rotation about a transverse axis in said enclosure, said axis extending transversely of said walls, drive means connected to said frame for causing said rotation, a work objects carrier connected to said frame for movement in a substantially circular path around said axis, means in said enclosure for contacting and treating said work objects with a hot degreasing solvent, each of said walls having an opening which is spaced from said axis at a distance substantially equal to the spacing of said carrier from said axis, said openings being substantially transversely aligned, whereby the carrier comes into registry with said openings in the course of its movement about said axis, and said frame including a roller which extends generally across but slightly below an imaginary line extending from the bottom of one of said openings to the bottom of the other of said openings.

7. The machine defined in claim 6 wherein both said openings are located at the level of the top of the path of movement of said carrier, wherein said frame includes a structural member which is substantially vertical when said carrier is in registry with said openings, and wherein said roller is substantially perpendicular to said structural member.

8. The machine defined in claim 6 wherein said frame comprises a generally elongated structure having near its ends two rods which are substantially parallel to said axis, wherein two of said carriers and rollers are provided, each carrier being pivotally carried by one of said rods, each of said rollers being substantially perpendicular to said rods.

9. The machine defined in claim 8 wherein said rollers are spaced from the axes of the corresponding rods at a distance substantially equal to the depths of the corresponding carriers.

10. In a machine for degreasing work objects the combination comprising an enclosure including opposed walls, a rotatable frame in said enclosure, said walls having a pair of openings located at substantially a common level in opposed portions of said walls, said openings being substantially aligned with one another, said frame having a work carrier which is arranged to be moved up and down in said enclosure and into and out of registry with said openings, a platform carried by one of said walls outside said enclosure at substantially the level of the bottom of the corresponding opening, a platform carried by the other of said walls outside said enclosure at substantially the level of the bottom of its corresponding opening, said carrier having supporting means which extends in the direction from one of said openings toward the other of said openings, containers for the work objects, said containers being constructed to slide from one of said platforms through one of said openings across said supporting means through the other of said openings to the other of said platforms, said frame including a supplemental support which is located intermediate said supporting means and one of said openings, said supplemental support being at a level to support said containers as they are moved between said supporting means and said opening, when said openings and said carrier are in substantial registry, and said supporting means comprising an elongated roller the axis of which is substantially parallel to the adjacent wall.

References Cited in the file of this patent

UNITED STATES PATENTS

| | | |
|---|---|---|
| 1,490,310 | Blakeslee | Apr. 15, 1924 |
| 1,692,190 | Templeton | Nov. 20, 1928 |
| 1,742,393 | Hooper et al. | Jan. 7, 1930 |
| 1,960,339 | Howard | May 29, 1934 |
| 2,673,835 | Kearney | Mar. 30, 1954 |